June 6, 1939. W. HENNEBERG 2,161,466
ELECTRON OPTICS
Filed July 8, 1936

INVENTOR
WALTER HENNEBERG
BY
ATTORNEY

Patented June 6, 1939

2,161,466

UNITED STATES PATENT OFFICE 2,161,466

ELECTRON OPTICS

Walter Henneberg, Berlin-Charlottenburg, Germany, assignor to Allegemeine Elektricitatz Gesellschaft, Friedrick Karl, Berlin, Germany Application July 8, 1936, Serial No. 89,507
In Germany May 20, 1935

4 Claims. (Cl. 250—27.5)

This invention relates to electron optics and in particular, to methods and means for producing electron optical mirrors and reflecting surfaces which shall have the equivalent properties of those encountered in light.

It is known that the imaging or the production of patterns by the aid of electron rays is accomplishable by the use of electric or magnetic lenses. The lens systems known in the prior art mostly involve the defect that the electron rays issuing from a given point and also possessing non-uniform rates of velocity, fail to be concentrated or focused in one point. This chromatic error, as it were, makes itself felt in a troublesome manner particularly where the velocity distribution of the electrons is marked. It has not been feasible in the prior art to obviate this defect in a satisfactory way, on the ground that no satisfactory ways and means have been known to create successfully electronic systems insuring a diffuse lens action so as to be useful in practice. But the production of electron-optic condensing lenses is no longer attended with any fundamental difficulties any more today.

Owing to the lack of electron-optic divergent or dispersive lenses, imaging by the aid of electronic rays or pencils with the use of lenses has heretofore been limited in a certain sense. Now, this limitation may be obviated, according to the present invention, by that for the electron-optic imaging recourse is had to electron mirrors or reflectors.

Electron mirrors, contra-distinct to electronic lenses, may be designed in a rather simple manner both in the form of condensing mirrors or of negative or divergent mirrors or else as planar mirrors or plain reflectors. In other words, it is feasible to effect electron-optic imaging, say, of an electron-emitting surface by the use of on or several electron mirrors. However, in a great many instances it is advantageous to combine the mirrors with electron lenses or lens systems. What thus results are imaging systems whose chromatic errors may, under certain circumstances, be considerably diminished and even be practically eliminated.

According to this invention, such an electron mirror or reflector consists of a planar or surface-electrode mounted in the path of the electrons kept at a negative potential, and a diaphragm-like electrode mounted anteriorly of the said first electrode and permitting the passage of the whole electron pencil, the said second electrode being maintained in reference to the said first electrode at a less negative or a positive potential. Between the stop or diaphragm electrode and the surface or planar electrode, potential surfaces are set up on which the incoming or impinging electrons, according to their inherent velocity, will be reflected sooner or later. The surface electrode mounted in the path of the electron rays or pencil may be provided, according to the required action, with a concave or convex curvature or else may be flat or non-curved.

The invention shall be described in more detail by reference to the attached drawing, in which.

Figure 1:
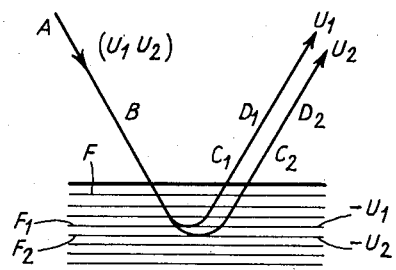
Fig. 1 is to illustrate the theory of the invention.

Fig. 1 illustrates the idealized instance of a homogeneous retarding field F by which the function of an electronic mirror or reflector, in this case particularly of a planar mirror, is clearly illustrated. As electrons with dissimilar inherent volt speed $U_1$ and $U_2$ on the trajectory or path indicated by AB reach the electrical field through the potential lines or surfaces F, they will describe parabolas of a greater radius of curvature and in the presence of a lower rate of speed $U_1$, for instance, they will experience reflection upon the surface $F_1$. But if the speed is higher, say, $U_2$, such reflection will occur only on the surface being at a higher potential, say, surface $F_2$. The result is that the pencil AB consisting of electrons of dissimilar rates of velocities will be resolved or broken up into partial pencils $C_1 D_1$, $C_2 D_2$, etc., in accordance with the initial speeds of the electrons. The uniform reflecting mirror surface as known from optics, for example, is in the present case replaced by a series of reflective potential surfaces. The potential surface on which, for instance, an electron pencil having the volt speed $U_1$ is reflected, then has the potential $-U_1$ referred to the region or space in which the electron speed was found to be $+U_1$.

So far as the action of the electron mirror is concerned it is essential that the path of the rays or pencil should not contain any electrodes which will absorb electrons or cause diffuse dispersion or divergence thereof. The real electrodes which are causative of the formation of the potential field of the mirror must be chosen so markedly negative, or else be positive so far laterally and exteriorly of the path of the pencil or rays that they will not be attained by any electrons.

In what way the shape of the electrodes and also their number should be chosen is a matter depending on the desired form of the mirror (for instance, planar or condenser mirror).

Figure 2:
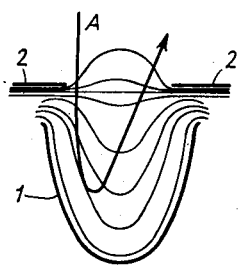
Figs. 2–5 show various embodiments of the invention.
Figure 3:
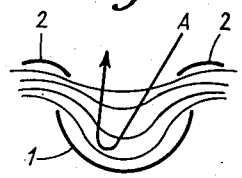

Figs. 2 to 5 show exemplified embodiments of the electronic mirror or reflector according to this invention. Figs. 2 to 3 show mirrors which are substantially condensing in nature.

In the arrangement Fig. 2 the planar electrode 1 presents a parabolic curvature to the incoming or arriving electron rays. If the electrons have a voltage of 75 v., for instance, then a potential amounting to −100 v. should be applied to it. Mounted anteriorly of the opening of the mirror is disposed the stop or diaphragm-type of electrode 2. The latter, for instance, may be kept at zero potential. The aperture of electrode 2 is so chosen that the electron pencil A will as far as feasible not be impeded or obstructed in any way. The space of the electrode 2 is free from field actions. Now, between electrodes 1 and 2, as can be seen from the drawing, are set up potential surfaces, and of these, one serves as a reflecting surface for the electron pencil A being of uniform speed. The question whether the electron pencil serves as a condensing mirror or as a planar or uncurved mirror or else as a divergent or dispersive mirror, depends upon the speed of the electrons and the potential of the mirror electrodes. If the velocity in terms of volts of the ray pencil (referred to the potential of the surface electrode 1) is high, the said reflection will be brought about, as shown, only at a potential surface presenting a curvature according to, and chosen for, the electrode. In this instance, the mirror thus produced a condensing effect. In the presence of a lower velocity of the electrons reflection may take place already on the planar potential surface or even on one of the surfaces having a convex curvature. In other words, the potential field of the reflector then acts either as a planar mirror or else as a divergent or dispersive mirror. As a general rule, it is convenient to permit the electron pencils or rays to be reflected on the potential surfaces closest to the electrode 1. These particular potential surfaces come closest to the shape of the electrodes, and by means of forming the electrode 1 in a corresponding way they can be fixed in the simplest and safest way.

The space anteriorly of the apertured or diaphragm electrode 2 need not be absolutely free from fields. On the contrary, the diaphragm itself could act, for instance, as an accelerative electrode. Moreover, instead of one such diaphragm, two or even more may be provided. The shape of the potential surface may then be governed more readily under certain circumstances. If the mirror is to act as a condensing reflector, then the reflecting surfaces will consist only of the potential surfaces in the vicinity of the electrode. The fact that at greater distance mostly differently curved potential surfaces exist is practically of no importance seeing that the effectiveness of these surfaces, because of the high electron speeds still prevailing there, as contrasted with the effectiveness of the potential surfaces in the neighborhood of the electrodes is but small.

The focusing or condensing mirror shown in Fig. 3 comprises a reflector electrode 1 having hemispheric or cap shape. The apertured diaphragm 2 is here inwardly flared or funnel-formed in the direction of the interior of the sphere. This insures better and closer adaptation to the spherical form of electrode 1 also for the more remote potential surfaces.

Figure 4:
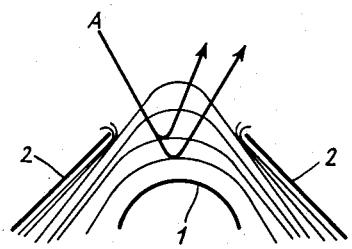

Fig. 4, for instance, shows a divergent mirror. Electrode 1 has a convex curvature of hemi-spherical form, whereas the apertured diaphragm 2 is shaped like a metal funnel. The adaptation of the potential surfaces to the electrode 1 is made considerably more favorable as a result. The ray or pencil A which is here assumed to consist of electrons of two different speeds is resolved into two partial rays (reflection rays).

Figure 5:
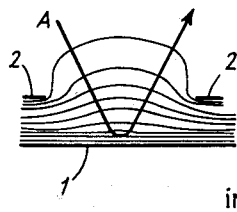

Fig. 5, for instance, illustrates a planar mirror according to this invention. The surface electrode 1 also in this case is negatively charged in reference to the apertured stop or diaphragm 2. For lower electron speed, reflection occurs on the remoter convex potential surfaces rather than on the practically flat surfaces. The electrode system then acts as a dispersive mirror.

In all of the exemplified embodiments here shown, the so-called surface or planar electrode is assumed to consist of a solid sheet. However, it will be evident that apertures could be provided in this sheet with a view to influencing the shape of the potential lines in certain ways.

Having described my invention, what I claim as new and desire to secure by Letters Patent is:

1. The method of reflecting electrons which comprises the steps of developing a retarding field of substantially continuous equi-potential contours, directing a beam of electrons toward the developed field, said beam having a cross-sectional area relatively small compared to the area of the developed retarding field, and regulating the gradient of the developed field to prevent the directed beam of electrons from completely penetrating the developed field.

2. The method of reflecting electrons which comprises the steps of developing a retarding field of substantially continuous equi-potential contours, directing a beam of electrons toward the developed field, said beam having a cross-sectional area relatively small compared to the area of the developed retarding field, regulating the gradient of the developed field to prevent the directed beam of electrons from completely penetrating the developed field, and further regulating the gradient of the developed field to produce planar reflection of the directed electrons.

3. The method of reflecting electrons which comprises the steps of developing a retarding field of substantially continuous equi-potential contours, directing a beam of electrons toward the developed field, said beam having a cross-sectional area relatively small compared to the area of the developed retarding field, regulating the gradient of the developed field to prevent the directed beam of electrons from completely penetrating the developed field, and further regulating the gradient of the developed field to produce converging reflection of the directed electrons.

4. The method of reflecting electrons which comprises the steps of developing a retarding field of substantially continuous equi-potential contours, directing a beam of electrons toward the developed field, said beam having a cross-sectional area relatively small compared to the area of the developed retarding field, regulating the gradient of the developed field to prevent the directed beam of electrons from completely penetrating the developed field, and further regulating the gradient of the developed field to produce diverging reflection of the directed electrons.

WALTER HENNEBERG.